United States Patent
Oyama

[11] Patent Number: 6,155,654
[45] Date of Patent: Dec. 5, 2000

[54] METHOD FOR CONTROLLING ELECTROMAGNETIC PROPORTIONAL PRESSURE CONTROL VALVE

[75] Inventor: Hitoshi Oyama, Itami, Japan

[73] Assignee: Sumitomo Electric Industries, Ltd., Osaka, Japan

[21] Appl. No.: 09/222,917

[22] Filed: Dec. 30, 1998

[30] Foreign Application Priority Data

Jan. 9, 1998 [JP] Japan .................................. 10-003287

[51] Int. Cl.$^7$ ...................................................... B60T 8/38
[52] U.S. Cl. ...................................... 303/117.1; 303/119.2; 251/129.15
[58] Field of Search .............................. 303/119.2, 119.3, 303/115.2, 117.1; 251/129.15, 129.01, 129.09, 129.16, 129.17, 129.19, 129.2, 129.21

[56] References Cited

U.S. PATENT DOCUMENTS

| | | |
|---|---|---|
| 3,709,253 | 1/1973 | Spangenberg . |
| 4,366,524 | 12/1982 | Kuroiwa et al. . |
| 4,434,933 | 3/1984 | Tamura . |
| 4,960,365 | 10/1990 | Horiuchi . |
| 5,636,908 | 6/1997 | Yamamuro ........................... 303/117.1 |
| 5,667,285 | 9/1997 | Seetharaman et al. .............. 303/116.2 |
| 5,791,318 | 8/1998 | Schulz et al. ....................... 251/129.07 |

FOREIGN PATENT DOCUMENTS

| | | |
|---|---|---|
| 1145483 | 6/1989 | Japan . |
| 1199079 | 8/1989 | Japan . |
| 4343605 | 11/1992 | Japan . |
| 98/22752 | 5/1998 | WIPO . |

*Primary Examiner*—Robert J. Oberleitner
*Assistant Examiner*—Devon Kramer
*Attorney, Agent, or Firm*—Greenblum & Bernstein, P.L.C.

[57] ABSTRACT

In vibrating a spool of a spool-valve type electromagnetic proportional pressure control valve by applying a dither current so that no static friction acts on the spool, the dither effect tends to weaken in a region where the current is small and in a region where the current is so large as to cause magnetic saturation. An alternating dither current is superimposed on the current supplied to an electromagnet to vibrate the spool with an amplitude small enough not to affect the liquid pressure, and in a control region where the ratio of the solenoid force Fsol to the current I is small, the dither current is controlled so that its amplitude is larger or its frequency is lower than in other regions.

5 Claims, 9 Drawing Sheets

Dither current

Dither current

Dither current

METHOD FOR CONTROLLING ELECTROMAGNETIC PROPORTIONAL PRESSURE CONTROL VALVE

BACKGROUND OF THE INVENTION

This invention relates to a method of controlling a spool-valve type, electromagnetic proportional pressure control valve used for accurate control of brake fluid pressure or the like.

Electromagnetic proportional pressure control valves have a driving means comprising an electromagnet and a spring. The driving means moves a spool to a position corresponding to its driving force, thereby controlling the fluid pressure applied to a load to a valve corresponding to the driving force of the driving means. A typical electromagnetic proportional pressure control valve is shown in FIG. 2.

The electromagnetic proportional pressure control valve 1 of FIG. 2 comprises a housing 2, a spool 9, a reaction pin 12 inserted at one end of the spool 9, a spring 13 for biasing the spool, and an electromagnet 14 for biasing, i.e. pulling, the spool 9 in the direction opposite to the direction in which the spool is biased by the spring 13.

The housing 2 has a spool guide bore 3 in which is substantially liquid-tightly and slidably received the spool 9, a supply port 4, an output port 5 and an exhaust port 6 all opening to the bore 3 at its intermediate portions, and first and second fluid chambers 7, 8 into which one and the other ends of the spool 9 protrude, respectively.

The spool 9 has a surface passage 10, and an internal passage 11 kept in communication with the load port 5. The internal passage 11 has one end open to the first fluid chamber 7, and at this end, the reaction pin 12 is substantially liquid-tightly inserted in the passage 11. Thus, a difference equal to the sectional area of the reaction pin is created between the area for bearing fluid pressure that urges the spool 9 toward the first fluid chamber 7 and the area for bearing fluid pressure that urges the spool toward the second fluid chamber 8. The spool 9 is thus biased downward in the figure under a thrust which is equal to the abovesaid difference in area multiplied by the pressure at the load port 5.

Between a land 9a formed on the outer periphery of the spool 9 and the supply port 4, a first valve portion 15 is formed to open and shut off communication between the supply port 4 and the output port 5. Between a land 9b formed on the outer periphery of the spool 9 and the exhaust port 6, a second valve portion 16 is formed to open and shut off communication between the output port 5 and the exhaust port 6. The degree of opening of each of the first and second valves 15, 16 changes with the spool position.

With this electromagnetic proportional pressure control valve 1, during a non-control state in which no current is supplied to the electromagnet 14, the spool 9 is maintained in the illustrated position by the spring 13. In this state, the first valve portion 15 is open, so that fluid pressure from the pressurizing port 4 flows into the output port 5.

When the electromagnet 14 is energized, the spool 9 is pulled downward in the figure by the electromagnetic force until the upward force balances with the downward force.

The relation at the balancing point is given by the following formula (1). Until the first valve portion 15 closes, the pressure at the output port 5 and the spool moving distance increase with the exciting current I. When the current I further increases after the first valve portion 15 has been closed, the second valve portion 16 will open, thus opening the output port 5 to the depressurizing port 6. The pressure at the output port 5 thus drops.

$$Fpr + Fsol = Fsp \tag{1}$$

Fsp: force of the spring 13
Fsol: driving force by the electromagnet 14
Fpr: thrust resulting from fluid pressure
Fpr in the above equation is given by:

$$(P2-P3) \cdot S$$

Wherein P2 is the pressure at the output port 5 (load pressure), P3 is the reservoir pressure, and S is the sectional area of the reaction pin 12.

On the other hand, Fsol equals $a - b \cdot I_2$ (a and b are constants). Thus, the following relations are met:

$$(P2-P3) \cdot S + (a - b \cdot I_2) = Fsp$$

$$\therefore P2 = (Fsp - a + b \cdot I_2)/S + P3 \tag{2}$$

Since Fsp, a, b, S and P3 are all constants, the pressure P2 is proportional to the current I. In the equation (1), (Fsp−Fsol) is the spool driving force by the driving means.

FIG. 1 shows an automotive brake system including this electromagnetic proportional pressure control valve. In this system, the supply port 4 is connected to a fluid pressure source (pump 24), the output port 5 is connected to a wheel brake 22, and the exhaust port 6 and the first and second fluid chambers 7, 8 are connected to a reservoir 25. The valve 1 controls fluid pressure supplied to the wheel brake 22 for antilock control or other vehicle behavior control.

The illustrated brake system includes a shutoff valve 23 disposed between the master cylinder 21 and the wheel brake 22. During a normal control mode, the valve 23 is kept open by the pressure of an accumulator 26. When necessary, the electromagnetic proportional pressure control valve 1 indirectly controls the pressure in the wheel brake 22 by controlling the fluid supply pressure to the shutoff valve 23.

When the spool begins to move, a large driving force is needed to overcome the static frictional force. Thus, with an electromagnetic proportional pressure control valve including a spool, during a short period immediately after the spool has begun to move, the static frictional force tends to break a proportional relationship between the current supplied to the electromagnet and the controlled fluid pressure.

Thus, in order to prevent the static frictional force from acting on the spool, a dither (that is, force having a controlled amplitude and frequency) is applied to the spool to keep the spool vibrating with such a small amplitude that will not affect the fluid pressure on the load.

Such a dither is produced by a current created by superimposing an alternating current (which will be referred to as dither current) on the current supplied to the electromagnet so that the center of amplitude of the former will be on the latter current.

In vibrating the spool by applying a dither, if the current supplied to the electromagnet is in the region smaller than $I_1$ (see FIG. 8) or in the region where magnetic saturation occurs in the magnetic circuit of the electromagnet, i.e. the region larger than $I_2$, the dither effect (that is, spool vibrating power) tends to weaken due to decreased ratio of the solenoid force Fsol to the current I supplied (Fsol/I).

If the amplitude of the dither current is increased so that a sufficient dither effect is achievable in these regions, the dither effect in other regions will be too strong, that is, the spool tends to vibrate excessively.

An object of this invention is to provide a method of controlling an electromagnetic proportional pressure control valve which can substantially level the dither effect over the entire control region.

SUMMARY OF THE INVENTION

According to this invention, in controlling the liquid pressure using an electromagnetic proportional pressure control valve, the characteristics of which is as shown in FIG. 8, a dither current-having an amplitude whose center is at a current supplied to the electromagnet is superimposed on the current to vibrate the spool with an amplitude small enough not to affect a liquid pressure controlled by the spool, and that in a control region where the ratio of the force Fsol produced by the electromagnet to the current I supplied to the electromagnet, i.e. Fsol/I is smaller than in other regions, the dither current is controlled such that its amplitude is greater or its frequency is lower than in the other regions.

If the pressure of a fluid whose viscosity changes extremely with temperature is to be controlled, a temperature detecting means is added to detect the temperature of the liquid and one of the following two methods is adopted, 1) In an arrangement in which the spool is vibrated by a dither current superimposed on the current supplied to the electromagnet, the amplitude or frequency of the dither current is changed so that the lower the temperature, the larger the amplitude and the lower the frequency.

2) In an arrangement in which the spool is vibrated by a pulsating component of a PWM-controlled current, the frequency of pulse width modulation is changed so that the lower the temperature, the lower the frequency.

This invention is applicable to not only the electromagnetic proportional pressure control valve shown in FIG. 2, but also to any electromagnetic proportional pressure control valve which has a spool moved to a point where the forces applied to both ends thereof balance with each other by the magnetic force of the electromagnet to control the liquid pressure at an output port to a value corresponding to the spool driving force.

By increasing the amplitude of the dither current or reducing its frequency, the spool vibrating force increases. In an arrangement in which the current of the electromagnet is controlled by pulse width modulation (PWM) to vibrate the spool by the pulsating component of the controlled current, the spool vibrating force increases by lowering the frequency of pulse width modulation. Thus, according to the present invention, the dither effect is strengthened in a region where the Fsol/I ratio is small to smooth the dither effect over the entire control region. It is thus possible to prevent worsening of the spool response due to weakening of the dither effect or pulsation of the liquid pressure due to excessive dither effect in a part of the control region.

If the pressure of a liquid whose viscosity tends to change excessively with temperature is to be controlled, the amplitude or frequency of the spool-vibrating dither current, or the frequency of the pulsating component of the spool-vibrating, PWM-controlled current (frequency of pulse width modulation) is changed according to the temperature detected by a temperature detector. It is thus possible to suppress change in responsiveness of the spool due to change in the liquid viscosity.

Other features and objects of the present invention will become apparent from the following description made with reference to the accompanying drawings, in which:

DETAILED DESCRIPTION OF THE PREFERRED EMBODIMENT

Figure 1:
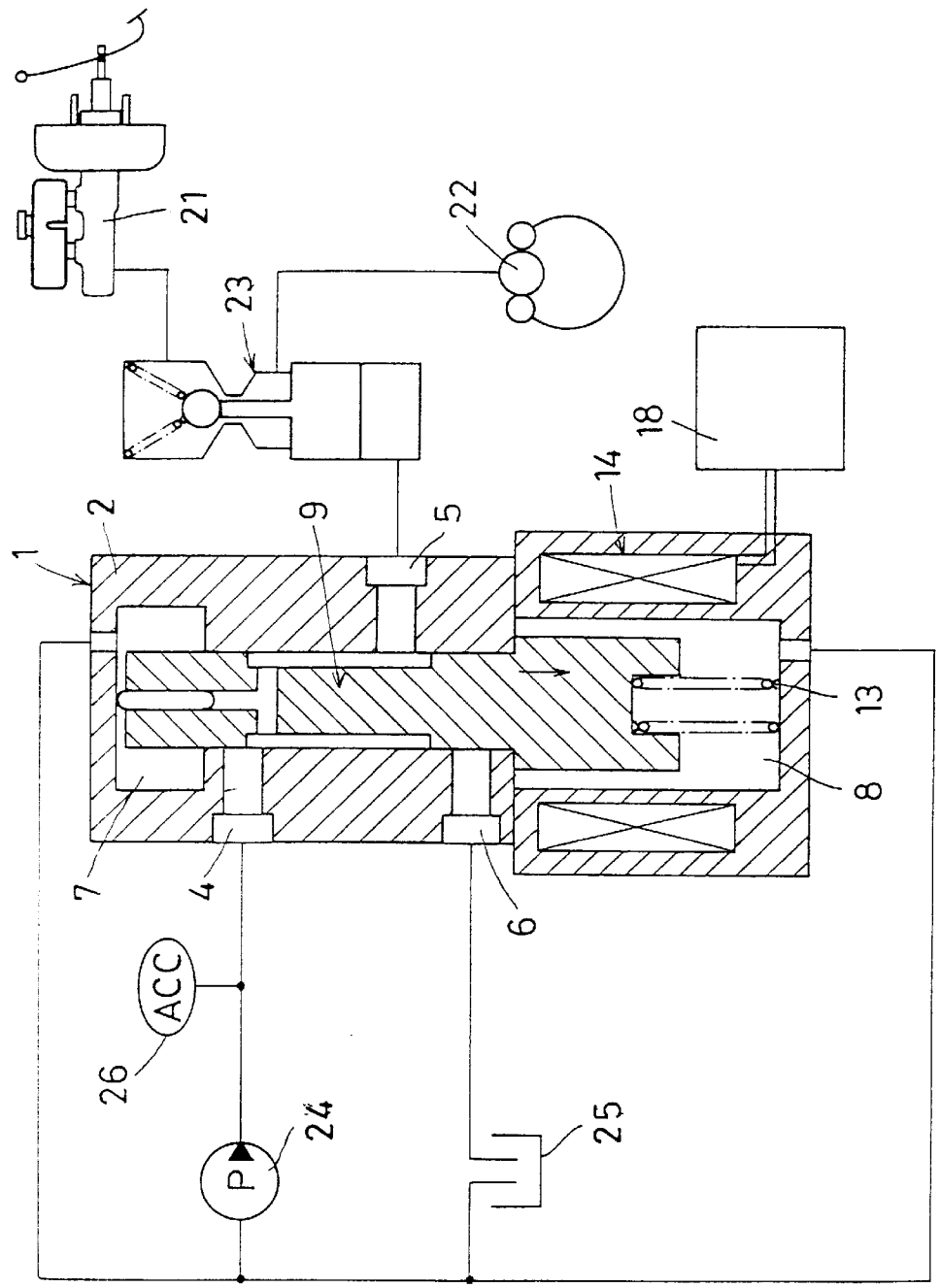
FIG. 1 is a circuit diagram of a brake system in which is used a spool-valve type electromagnetic proportional pressure control valve.
Figure 2:
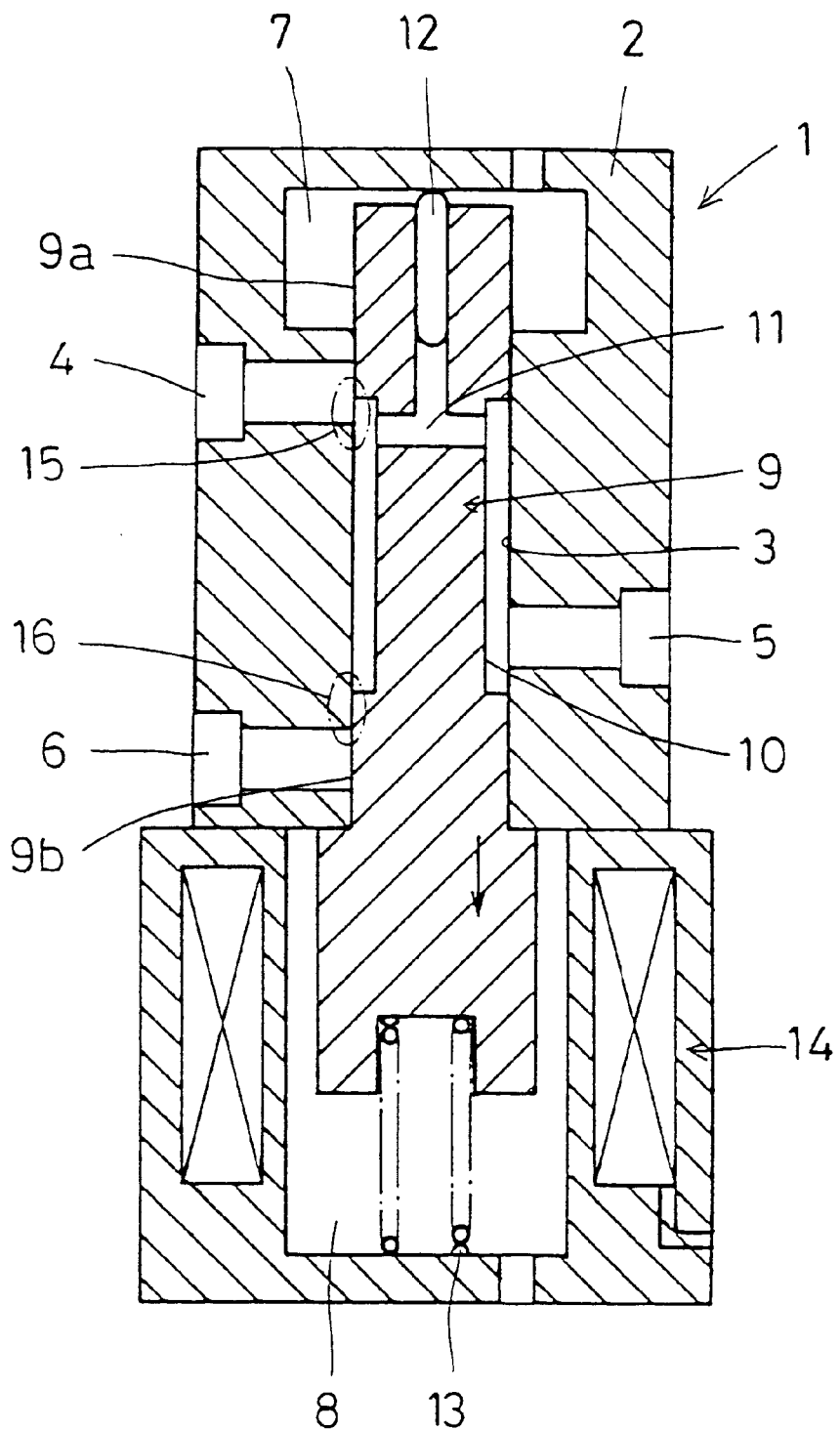
FIG. 2 is a sectional view of the electromagnetic proportional pressure control valve used in the system of FIG. 1.

Description is now made of the control method according to the present invention as applied to the electromagnetic proportional pressure control valve 1 in the brake system of FIG. 1.

Figure 3:
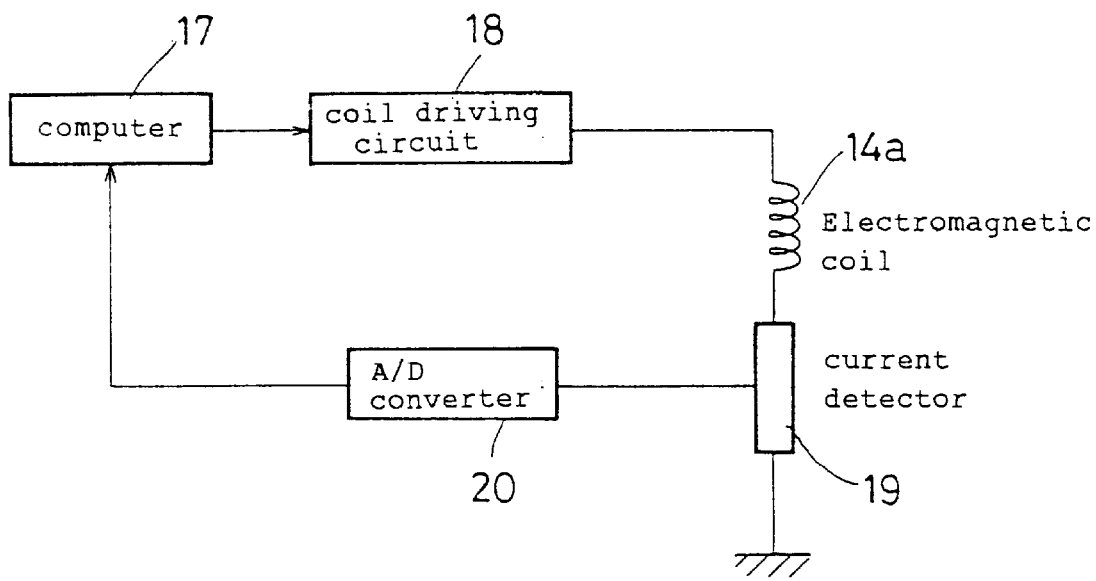
FIG. 3 is a block diagram of a drive control device.

The method according to this invention is carried out using control software and a simple drive control device shown in FIG. 3. This device comprises a microcomputer 17, a coil activating circuit 18, a current detector means 19 for detecting the current flowing through an exciting coil 14a of the electromagnet 14 of FIG. 1, and an A/D converter 20.

Figure 4:
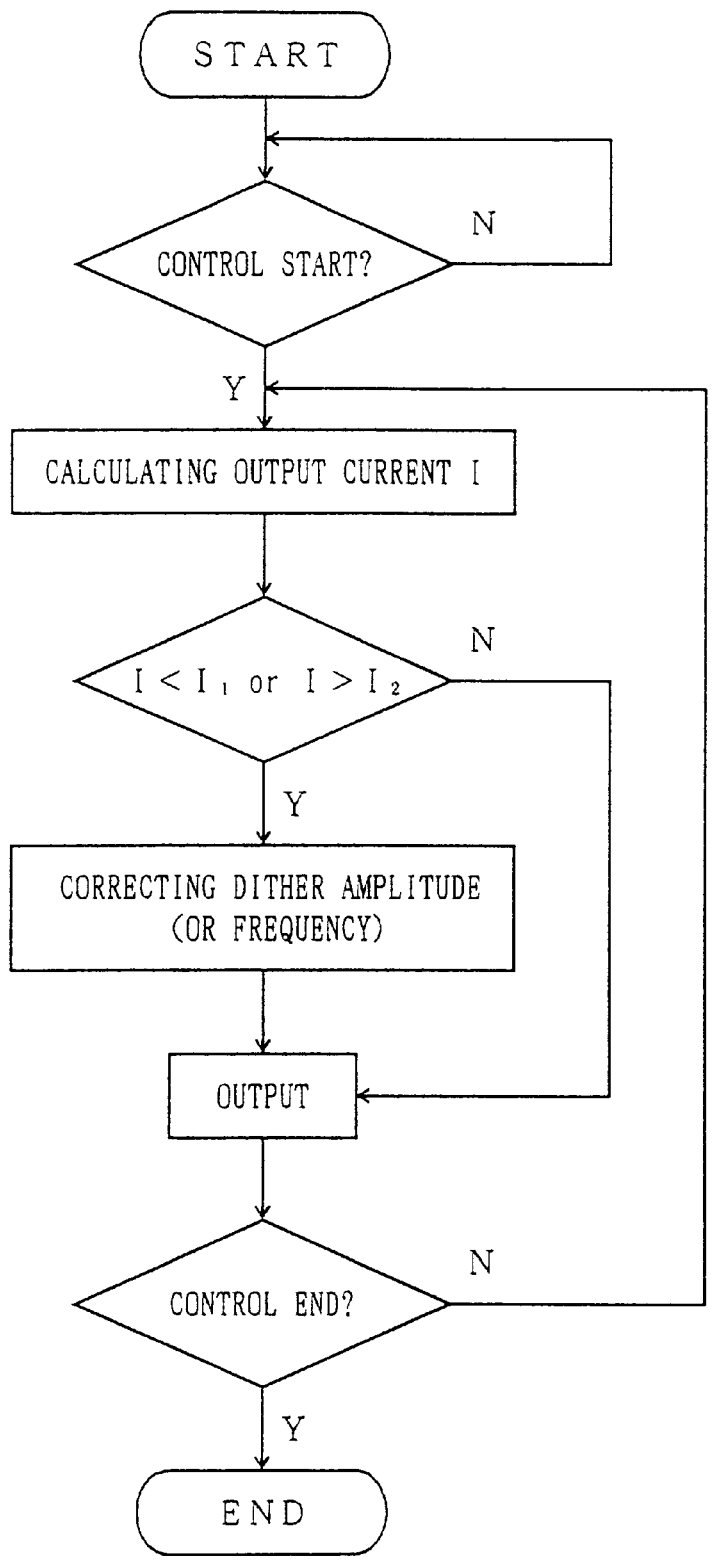
FIG. 4 is a control flowchart.

FIG. 4 shows an example of control for vibrating the spool 9 of the electromagnetic proportional pressure control valve 1 of FIG. 1 by applying a dither current.

As shown in FIG. 4, the microcomputer 17 calculates an output current I necessary to control the fluid pressure at the output port 5 to a target value when it judges (based on output signals from unillustrated vehicle behavior detection sensors such as wheel speed sensors, acceleration sensors and yaw sensors for detecting yawning of the vehicle) that the wheel brake 22 (see FIG. 1) needs pressure adjustment.

Figure 8:
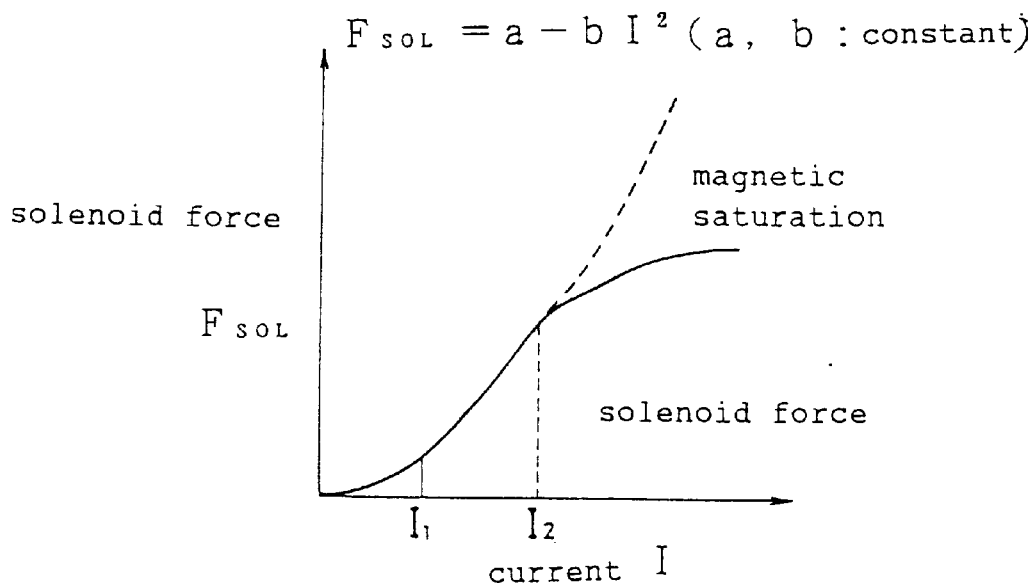
FIG. 8 is a graph showing the characteristics of an electromagnet.
Figure 9A:
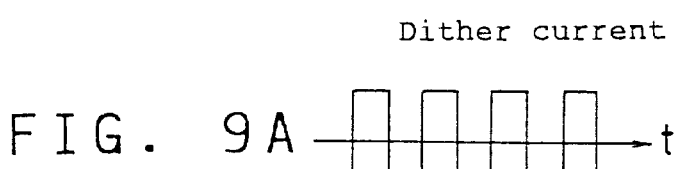
FIG. 9A shows a waveform of a dither current.

The microcomputer 17 also determines if the current I is in a region where the dither effect tends to weaken, e.g. in one of the region where the current is greater than $I_1$ (FIG. 8) and the region where it is smaller than $I_2$, and if out of these regions, controls the coil activating circuit 18 so that a current having a waveform formed by superimposing a dither current having a predetermined amplitude and frequency (such as shown in FIG. 9A) on the calculated current I will be supplied to the exciting coil 14a in FIG. 3 (this control is a feedback control in which the detection signal from the current detection means 19 is inputted).

Figure 9B:
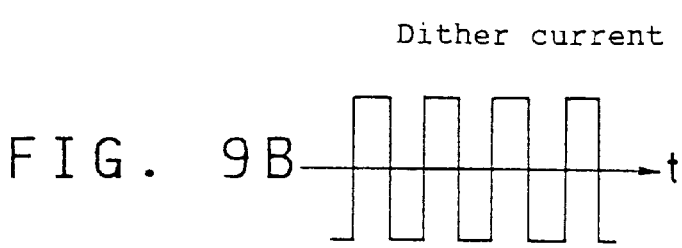
FIG. 9B shows a waveform obtained by amplifying the amplitude of the current of FIG. 9A.
Figure 9C:
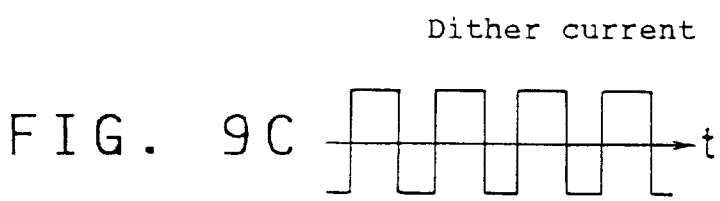
FIG. 9C is a waveform obtained by reducing the frequency of the current of FIG. 9A.

On the other hand, if the current I is in a region where the dither effect tends to weaken, i.e. if $I<I_1$ or $I>I_2$, the microcomputer controls the coil activating circuit 18 to increase the amplitude of the dither current to a level higher than the amplitude when $I_1 \leq I \leq I_2$ (as shown in FIG. 9B) or to reduce the frequency of the dither current to a level lower than the frequency when $I_1 \leq I \leq I_2$ (as shown in FIG. 9C) so that a current having a waveform formed by superimposing the corrected dither current on the current I will flow through the exciting coil 14a of FIG. 3.

The supply of the dither current may be started when e.g. the brake pedal is depressed. In this arrangement, since the spool 9 has already been vibrated with a small amplitude by the time when pressure adjustment is started (at this time, no normal current I is being supplied), the spool 9 can begin to move smoothly. The waveforms of the corrected dither currents used in the regions under $I_1$ and over $I_2$ may have constant amplitudes and frequencies as shown in FIGS. 9B and 9C, within such a range that the dither effect will not be too small or too large, or may be changed gradually with increase or decrease of the current being supplied. As seen in FIG. 8, in the region under $I_1$, the smaller the normal current I, the smaller the Fsol/I value, and in the region over $I_2$, the greater the normal current I, the smaller the Fsol/I value. By changing the amplitude or frequency to compensate for this, the dither current will exhibit its averaging effect to the maximum.

Figure 10:
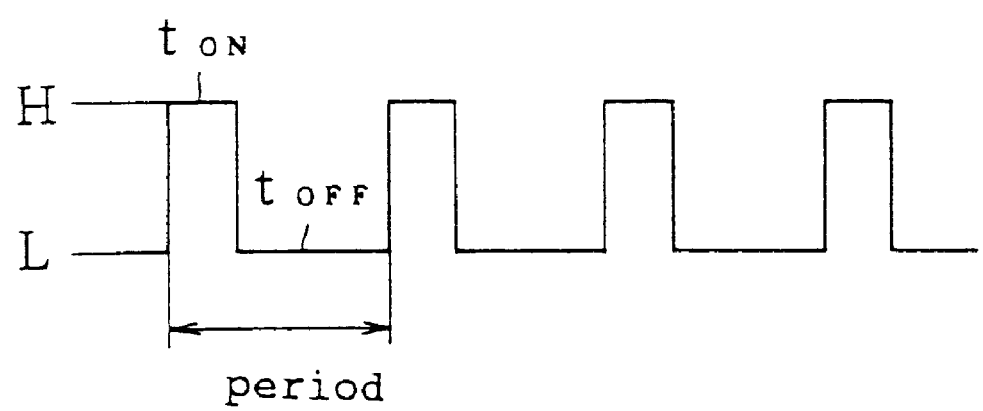
FIG. 10 shows a basic waveform of a PWM-controlled current.

The electromagnet 14 may be controlled by pulse width modulation (PWM) method. A basic waveform of a current produced by PWM control (in which the current supplied to the electromagnet is controlled by adjusting the on-off ratio of a power element) is shown in FIG. 10. This current waveform is ordinarily smoothed using an inductance and a reflux diode. But still, it is a pulsating waveform. In order to eliminate the influence of pulsation, the current is converted to a high-frequency current. But by lowering the frequency, it is possible to vibrate the spool 9 using the pulsating component.

In this method, the lower the PWM frequency, the greater the spool vibrating force. Thus, in the region under $I_1$ or over $I_2$ in FIG. 8, by reducing the PWM frequency given by the following equation to a level lower than the frequency used in the region between $I_1$ and $I_2$, the same results as when the amplitude or frequency of the dither current is changed can be achieved:

PWM frequency=1/(tON+tOFF)

tON: time while switch is on tOFF: time while switch is off

Figure 5:
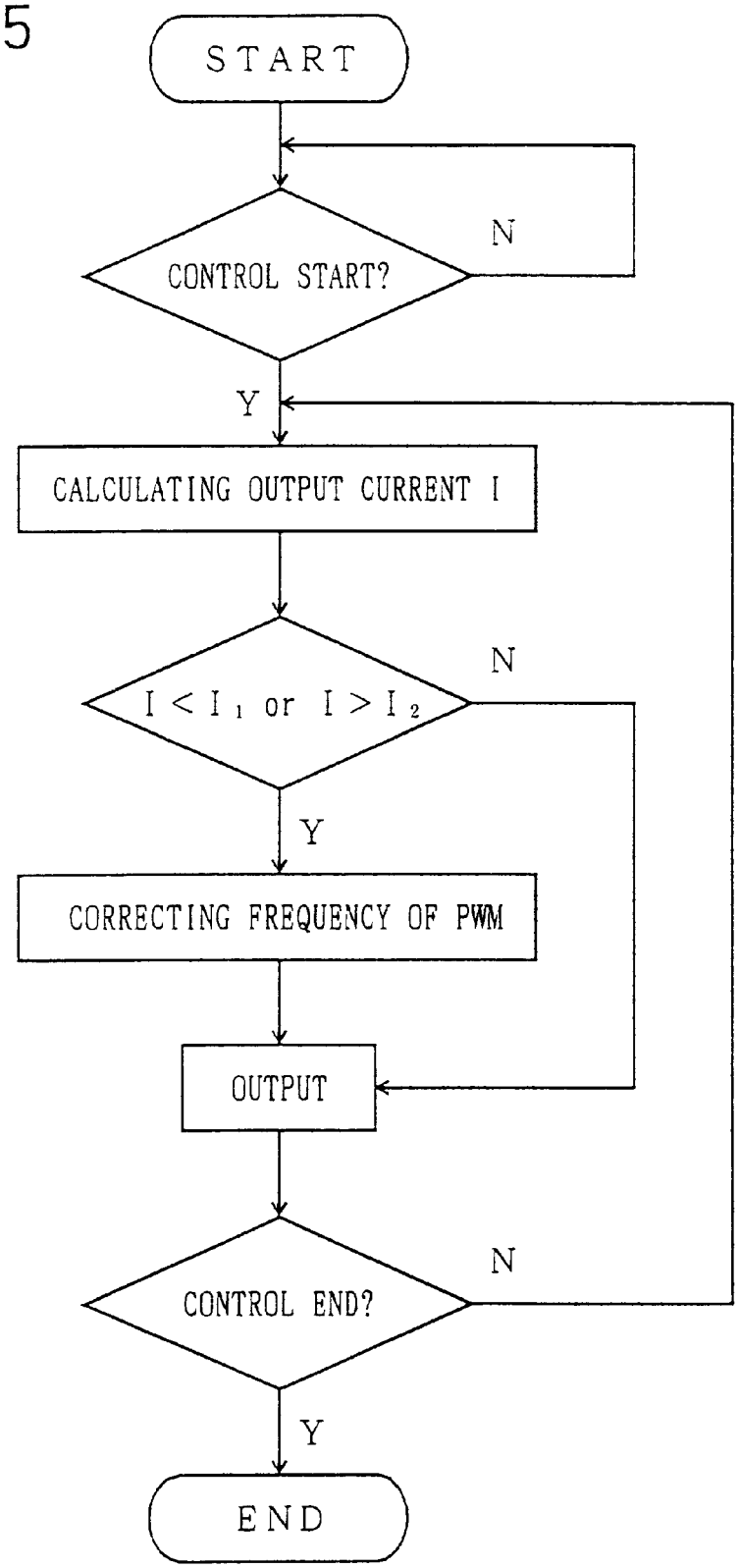
FIG. 5 is a different control flowchart.

In this case, the control flowchart is as shown in FIG. 5.

Next, in either of the method in which the spool is vibrated by applying a dither current or the method in which the spool is vibrated by a PWM-controlled pulsating current component, if the viscosity of a liquid to be controlled changes excessively with temperature, the dither effect will also change with the liquid viscosity. Thus, in this case, a temperature detecting means should be added to detect the temperature of the liquid to be controlled.

The temperature detecting means may be either of a type that directly detects the liquid temperature or a type that indirectly detects it (if there is a portion hose temperature changes proportionally). If there is no problem in accuracy, the temperature detecting means may be of a type that estimates the temperature based on temperature-related sensor information.

Figure 6:
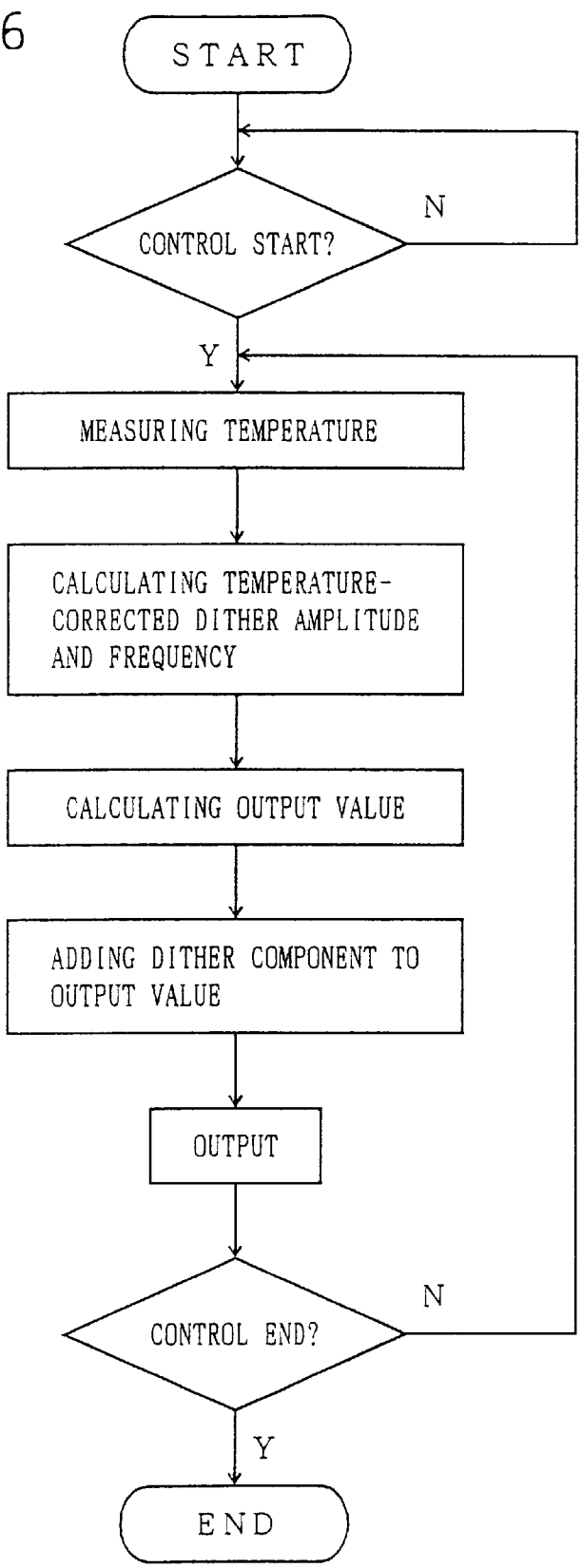
FIG. 6 is a control flowchart for temperature correction.

According to the temperature detected by the temperature detecting means, the waveform of the current controlled by the dither current or PWM may be changed. If the spool is to be vibrated by applying a dither current, the amplitude or frequency of the temperature-corrected dither current is calculated as shown in FIG. 6, and the coil activating circuit 18 is controlled such that a current having a waveform to which the dither current is added will flow through the exciting coil 14a.

Figure 7:
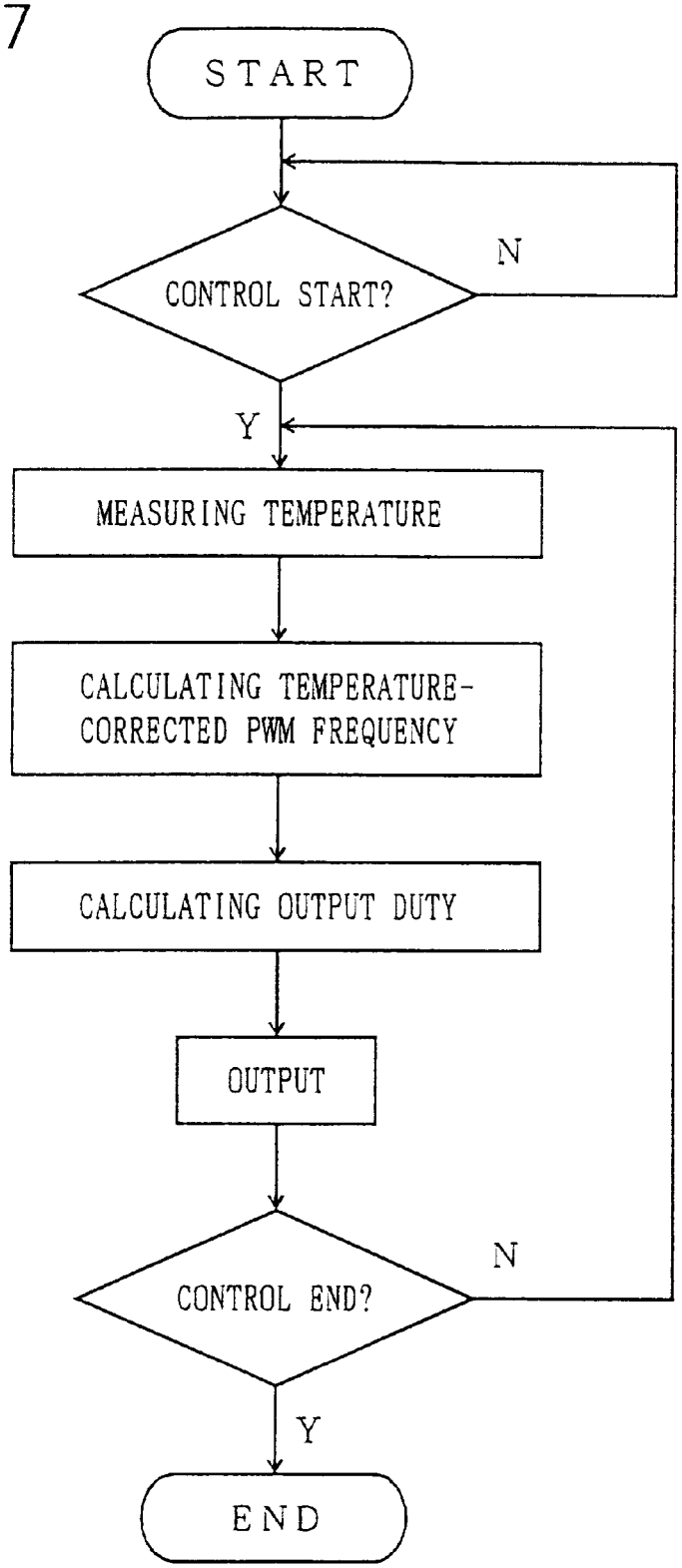
FIG. 7 is another temperature-correcting flowchart.

On the other hand, in the arrangement in which the spool is vibrated by the pulsating component of a PWM-controlled current, the temperature-corrected PWM frequency is calculated as shown in FIG. 7, and taking it into account an output duty is calculated to control the coil activating circuit 18. If the amplitude of dither current is to be changed, it is changed such that the lower the temperature, the greater the amplitude. If the frequency of the dither current or the PWM frequency is to be changed, they are changed such that the lower the temperature, the lower the frequency.

This suppresses change in the dither effect due to change in the liquid viscosity and thus prevents the movement of the spool from getting dull at low temperatures.

As described above, according to this invention, any change in the dither current due to changes in the characteristics of the electromagnet and the liquid viscosity is corrected by changing the amplitude or frequency of the dither current, or the frequency of a current suppressed by PWM method. Thus, it is possible to eliminate any bad influence due to change in the current supplied to the electromagnet and due to excessive change in the liquid viscosity with change in temperature, and thus to improve the response of the spool and stabilize proportional pressure control.

What is claimed is:

1. A method for controlling an electromagnetic proportional pressure control valve having an electromagnet and a spool adapted to be moved to a point where the magnetic force of said electromagnet balances with other forces applied to said spool when said electromagnet is energized, to control the liquid pressure at an output port to a value corresponding to the spool driving force by increasing and reducing the liquid pressure at the output port by the movement of said spool, characterized in that:

a dither current having an amplitude whose center is at a current supplied to said electromagnet is superimposed on the current to vibrate said spool with an amplitude small enough not to affect a liquid pressure controlled by said spool, and that in a control region where the ratio of the force Fsol produced by said electromagnet to the current I supplied to the electromagnet is smaller than in other regions, the dither current is controlled such that its amplitude is greater or its frequency is lower than in the other regions.

2. A method for controlling an electromagnetic proportional pressure control valve having an electromagnet whose exciting current is controlled by a pulse width modulation method, and a spool adapted to be moved to a point the magnetic force of said electromagnet balances with other forces applied to said spool when said electromagnet is energized, to control the liquid pressure at an output port to a value corresponding to the spool driving force by increasing and reducing the liquid pressure at the output port by the movement of said spool, characterized in that:

said spool is vibrated with an amplitude small enough not to affect a liquid pressure controlled by said spool, by a pulsating component contained in a current supplied to said electromagnet, and that in a control region where the ratio of the force Fsol produced by said electromagnet to the current I supplied to the electromagnet is smaller than in other regions, the frequency of the pulse width modulation is reduced to a level lower than in the other regions.

3. A method for controlling an electromagnetic proportional pressure control valve having an electromagnet and a spool adapted to be moved to a point where the magnetic force of said electromagnet balances with other forces applied to said spool when said electromagnet is energized, to control the liquid pressure at an output port to a value corresponding to the spool driving force by increasing and reducing the liquid pressure at the output port by the movement of said spool, in applications where the viscosity of fluid changes with temperature, characterized in that a dither current having an amplitude whose center is at a current supplied to said electromagnet is superimposed on the current to vibrate said spool with an amplitude small enough not to affect a liquid pressure controlled by said spool, and that a temperature detecting means is added to detect the temperature of the liquid to be controlled to change the amplitude of said dither current according to the detected temperature such that the lower the temperature, the larger the amplitude.

4. A method for controlling an electromagnetic proportional pressure control valve having an electromagnet whose exciting current is controlled by a pulse width modulation method, and a spool adapted to be moved to a point where the magnetic force of said electromagnet balances with other forces applied to said spool when said electromagnet is energized, to control the liquid pressure at an output port to a value corresponding to the spool driving force by increasing and reducing the liquid pressure at the output port by the movement of said spool, in applications where the viscosity of fluid changes with temperature, characterized in that said spool is vibrated with an amplitude small enough not to affect a liquid pressure controlled by said spool, by a pulsating component contained in a current supplied to said electromagnet, and that a temperature detecting means is added to detect the temperature of the liquid to be controlled to change the frequency of pulse width modulation according to the detected temperature such that the lower the temperature, the lower the frequency.

5. A method for controlling an electromagnetic proportional pressure control valve as claimed in claim 1–4, said electromagnetic proportional pressure control valve including:

a housing having a supply port connected to a liquid pressure source, an output port connected to an output, and an exhaust port connected to a reservoir, a first valve portion provided between said housing and said spool for opening and shutting off communication between said output port and said supply port according to the position of said spool, a second valve portion provided between said housing and said spool for opening and shutting off communication between said output port and said exhaust port, and a spool driving means comprising a spring and said electromagnet, said spool being adapted to move to a point where the driving force by said spool driving means balances with a thrust produced by receiving the pressure at said output port on pressure receiving portions of said spool having different areas in opposite directions, wherein with the movement of said spool, the state of communication between said output port and said supply or exhaust port changes, and the degrees of opening of said first and second valve portions are adjusted such that the pressure at said output port is controlled to a value corresponding to the driving force by said spool drive means.

* * * * *

UNITED STATES PATENT AND TRADEMARK OFFICE
CERTIFICATE OF CORRECTION

PATENT NO. : 6,155,654  
DATED : December 5, 2000  
INVENTOR(S) : H. Oyama

Page 1 of 1

It is certified that error appears in the above-identified patent and that said Letters Patent is hereby corrected as shown below:

<u>Column 8, claim 5,</u>  
Line 2, "1-4" should be -- 1 --.

Signed and Sealed this

Twelfth Day of February, 2002

Attest:

JAMES E. ROGAN  
*Director of the United States Patent and Trademark Office*

*Attesting Officer*